US008593986B2

(12) United States Patent
Vasseur et al.

(10) Patent No.: US 8,593,986 B2
(45) Date of Patent: Nov. 26, 2013

(54) LIGHTWEIGHT STORING MODE FOR CONSTRAINED COMPUTER NETWORKS

(75) Inventors: Jean-Philippe Vasseur, Saint Martin dUriage (FR); Jonathan W. Hui, Foster City, CA (US)

(73) Assignee: Cisco Technology, Inc., San Jose, CA (US)

( * ) Notice: Subject to any disclaimer, the term of this patent is extended or adjusted under 35 U.S.C. 154(b) by 223 days.

(21) Appl. No.: 13/150,956

(22) Filed: Jun. 1, 2011

(65) Prior Publication Data
US 2012/0307652 A1 Dec. 6, 2012

(51) Int. Cl.
*H04J 1/16* (2006.01)

(52) U.S. Cl.
USPC ........... 370/252; 370/216; 370/256; 370/408; 370/466; 709/224; 709/238; 709/252

(58) Field of Classification Search
USPC ........... 370/252, 256, 351, 408; 709/238, 252
See application file for complete search history.

(56) References Cited

U.S. PATENT DOCUMENTS

| 6,055,561 | A  | * | 4/2000 | Feldman et al. | 709/200 |
|---|---|---|---|---|---|
| 6,289,021 | B1 | * | 9/2001 | Hesse | 370/409 |
| 7,512,065 | B1 |   | 3/2009 | Phadnis et al. | |
| 7,693,064 | B2 | * | 4/2010 | Thubert et al. | 370/235 |
| 7,701,940 | B2 |   | 4/2010 | Novello et al. | |
| 7,801,041 | B2 | * | 9/2010 | Tse-Au | 370/231 |
| 7,801,857 | B2 | * | 9/2010 | Betts et al. | 707/628 |
| 7,826,355 | B2 |   | 11/2010 | Phadnis et al. | |
| 7,916,632 | B1 | * | 3/2011 | Lim et al. | 370/229 |
| 7,930,616 | B2 |   | 4/2011 | Gerstel et al. | |
| 8,264,957 | B1 | * | 9/2012 | Charny et al. | 370/230 |
| 8,310,957 | B1 | * | 11/2012 | Rekhter | 370/256 |
| 8,451,846 | B1 | * | 5/2013 | Ayyangar | 370/395.5 |
| 2002/0172157 | A1 | * | 11/2002 | Rhodes | 370/238 |
| 2003/0043755 | A1 | * | 3/2003 | Mitchell | 370/252 |
| 2008/0095045 | A1 | * | 4/2008 | Owens et al. | 370/220 |
| 2008/0118007 | A1 |   | 5/2008 | Fussell et al. | |
| 2009/0022070 | A1 | * | 1/2009 | Iovanna et al. | 370/256 |
| 2010/0215051 | A1 | * | 8/2010 | Solis et al. | 370/408 |
| 2010/0268817 | A1 | * | 10/2010 | Shah-Heydari | 709/224 |
| 2011/0274112 | A1 | * | 11/2011 | Czaszar et al. | 370/392 |

OTHER PUBLICATIONS

Shand, et al., IP Fast Reroute Using Not-via Addresses, Apr. 2011 http://datatracker.ietf.org/drafts/current/.*

(Continued)

*Primary Examiner* — Andrew Chriss
*Assistant Examiner* — Rasha Fayed
(74) *Attorney, Agent, or Firm* — Edwards Wildman Palmer LLP; James M. Behmke; Stephen D. LeBarron

(57) ABSTRACT

In one embodiment, a management device, such as a root node, monitors Internet Protocol (IP) overhead (e.g., IP header sizes during source-routing or route table sizes) within a directed acyclic graph (DAG) in a computer network. If it is determined that the IP overhead is above a configured threshold, then in response, a trigger is initiated to have devices within the DAG label-switch downward traffic directed away from the root node within the DAG. In another embodiment, a device communicating within a DAG stores IP routes corresponding to upward traffic from the device directed toward a root of the DAG, and IP-routes upward traffic based on the IP routes. Conversely, the device also stores labels corresponding to downward traffic from the device directed away from the root of the DAG, and label-switches downward traffic based on the labels, accordingly.

24 Claims, 16 Drawing Sheets

(56) References Cited

OTHER PUBLICATIONS

Karan, et al., Expires Sep. 14, 2011, Mar. 2011 http://datatracker.ietf.org/drafts/current/.*

"RPL: IPv6 Routing Protocol for Low Power and Lossy Networks" <draft-ietf-roll-rpl-19> by Winter, at al. (Mar. 13, 2011 version).

"Routing Metrics used for Path Calculation in Low Power and Lossy Networks" <draft-ietf-roll-routing-metrics-19> by Vasseur, et al. (Mar. 1, 2011 version).

"RPL Objective Function 0" <draft-ietf-roll-of0-11> by Thubert (May 5, 2011 version).

"The Minimum Rank Objective Function with Hysteresis" <draft-ietf-roll-minrank-hysteresis-of-03> by O. Gnawali et al. (May 3, 2011 version).

"An IPv6 Routing Header for Source Routes with RPL" <draft-ietf-6man-rpl-routing-header-03> by Hui, et al. (Mar. 29, 2011 version).

* cited by examiner

LIGHTWEIGHT STORING MODE FOR CONSTRAINED COMPUTER NETWORKS

TECHNICAL FIELD

The present disclosure relates generally to computer networks, and, more particularly, to resources associated with forwarding packets within constrained computer networks.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

Due to the constraints associated with LLNs, as well as for other types of networks and for other reasons, source routing may be used to forward packets through the network, such that a transmitting device inserts into the packet an explicitly indicated path to be followed. In this manner, devices in the network need not store routing information, and may simply pass a source-routed packet through the network according to the indicated path.

One of the main challenges with source routing (e.g., a "non-storing mode"), however, is that it may add significant header overhead to packets. For instance, in many LLNs, it is not rare to see networks with large diameters (e.g., up to 25 hops in some cases), which causes the header used to source-route the packet to become significantly large. Conversely, a network may use a "storing mode," in which intermediate devices are required to maintain routing states, thus not incurring additional header overhead. However, the memory requirements associated with route storage in storing mode can also become too large, particularly for constrained networks/nodes.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
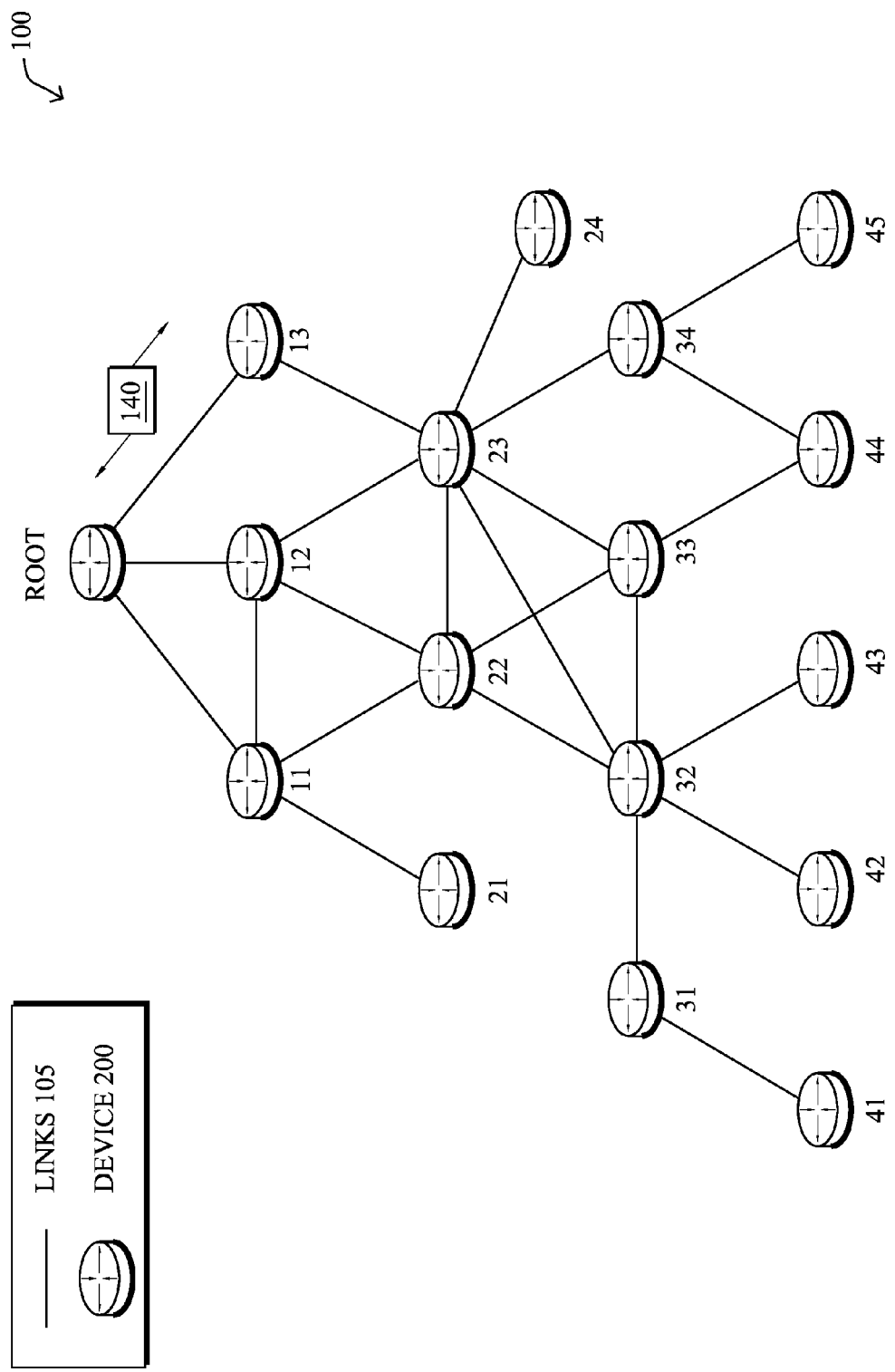
FIG. 1 illustrates an example computer network.

According to one or more embodiments of the disclosure, a management device, such as a root node, monitors Internet Protocol (IP) overhead (e.g., IP header sizes during source-routing or route table sizes) within a directed acyclic graph (DAG) in a computer network. If it is determined that the IP overhead is above a configured threshold, then in response, a trigger is initiated to have devices within the DAG label-switch downward traffic directed away from the root node within the DAG.

According to one or more additional embodiments of the disclosure, a device communicating within a DAG stores IP routes corresponding to upward traffic from the device directed toward a root of the DAG, and IP-routes upward traffic based on the IP routes. Conversely, the device also stores labels corresponding to downward traffic from the device directed away from the root of the DAG, and label-switches downward traffic based on the labels, accordingly.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically wireless networks, though wired connections are also available. That is, in addition to one or more sensors, each sensor device (node) in a sensor network may generally be equipped with a radio transceiver or other communication port, a microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

FIG. 1 is a schematic block diagram of an example computer network 100 illustratively comprising nodes/devices 200 (e.g., labeled as shown, "Root," "11," "12," ... "44," "45," and described in FIG. 2 below) interconnected by various methods of communication. For instance, the links 105 may be shared media (e.g., wireless links, PLC links, etc.), where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, while the embodiments are shown herein with reference to a generally "tree" shaped network, the description herein is not so limited, and may be applied to networks that have branches emitting to all directions from with the root node generally centralized among a plurality of surrounding nodes Data packets 140 (e.g., traffic and/or messages sent between the devices/nodes) may be exchanged among the nodes/devices of the computer network 100 using predefined network communication protocols such as certain known wireless protocols (e.g., IEEE Std. 802.15.4 (or 15.4g), WiFi, Bluetooth®, etc.) or other shared media protocols where appropriate (e.g., PLC). In this context, a protocol consists of a set of rules defining how the nodes interact with each other.

Figure 2:
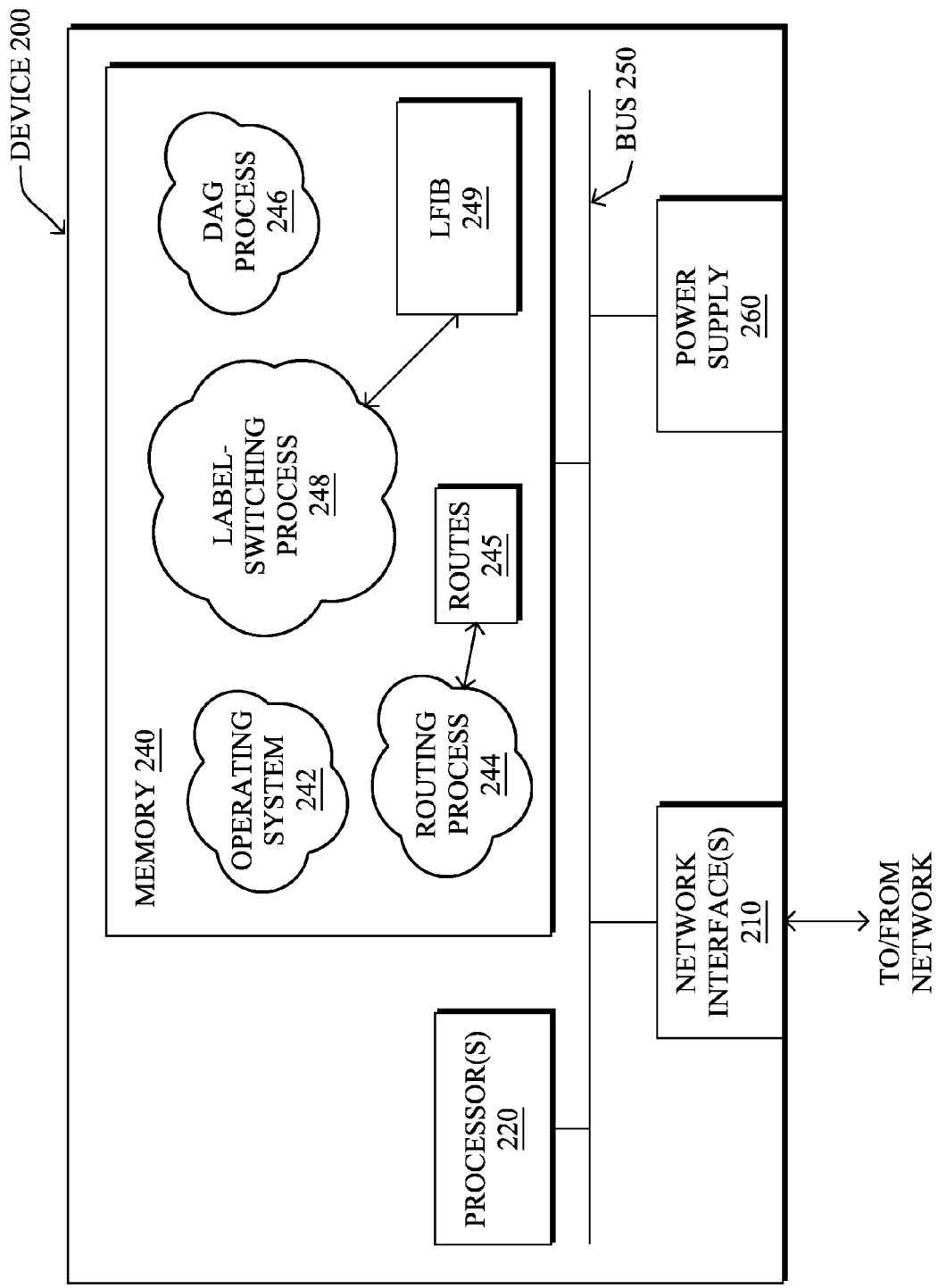
FIG. 2 illustrates an example network device/node.

FIG. 2 is a schematic block diagram of an example device 200 that may be used with one or more embodiments described herein, e.g., as a source-routing device such as the root device or other source-route head-end device. The device may comprise one or more network interfaces 210 (e.g., wireless), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100 (e.g., wirelessly, via PLC, etc.). The network interfaces may be configured to transmit and/or receive data using a variety of different communication protocols, particularly depending upon the underlying transmission medium (e.g., wireless, PLC, wired, etc.). Note, further, that a node may have two different types of network connections 210, namely, wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise necessary elements or logic adapted to execute the software programs and manipulate the data structures, such as routing table ("routes") 245 and label forwarding information base (LFIB) 249. An operating system 242, portions of which are typically resident in memory 240 and executed by the processor, functionally organizes the device by, inter alia, invoking operations in support of software processes and/or services executing on the device. For instance, these software processes and/or services may comprise routing process/services 244, which may include a directed acyclic graph (DAG) process 246 in certain embodiments, and also a label-switching process 248 as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table 245 containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Label-switching process (services) 248 contains computer executable instructions executed by the processor 220 to perform functions provided by one or more label-switching protocols in which a path for a source-destination pair may be established along label switched routers (LSRs), and values required for forwarding a packet between adjacent LSRs in the path together with headers or "labels" are prepended to the packet. The labels are used to direct the packet to the correct interface and "next-hop" router. The labels precede any IP or other headers allowing use of smaller outer headers for the packet. The path for the source-destination pair, termed a Label-Switched Path (LSP), can be established according to various different approaches, such as described herein. A Label Forwarding Information Base (LFIB) 249 stores the LSP labels.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks" <draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks" <draft-ietf-roll-routing-metrics-19> by Vasseur, et al. (Mar. 1, 2011 version). Further, an example OF (e.g., a default OF) may be found in an IETF Internet Draft, entitled "RPL Objective Function 0" <draft-ietf-roll-of0-11> by Thubert (May 5, 2011 version) and "The Minimum Rank Objective Function with Hysteresis" <draft-ietf-roll-minrank-hysteresis-of-03> by O. Gnawali et al. (May 3, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
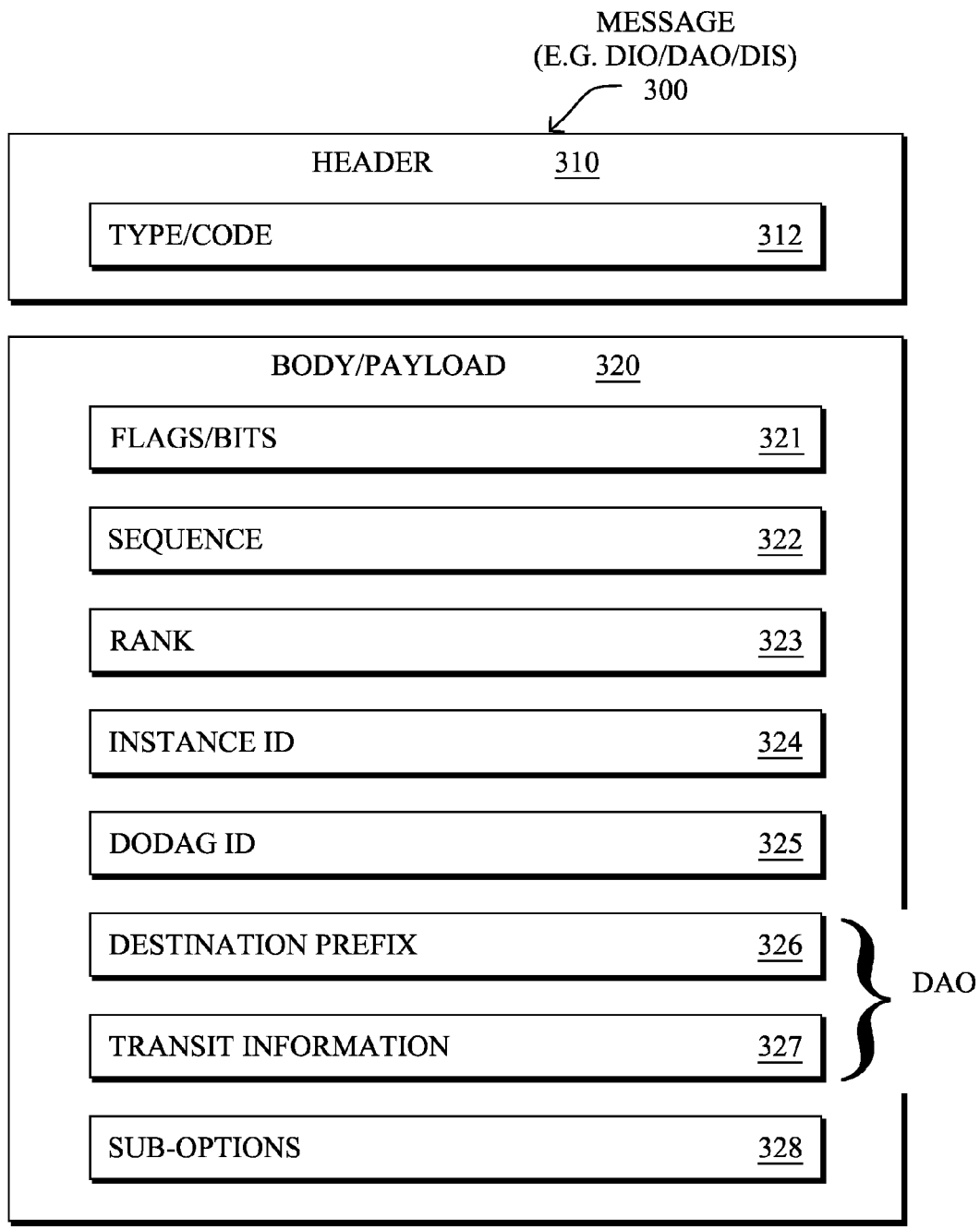
FIG. 3 illustrates an example message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
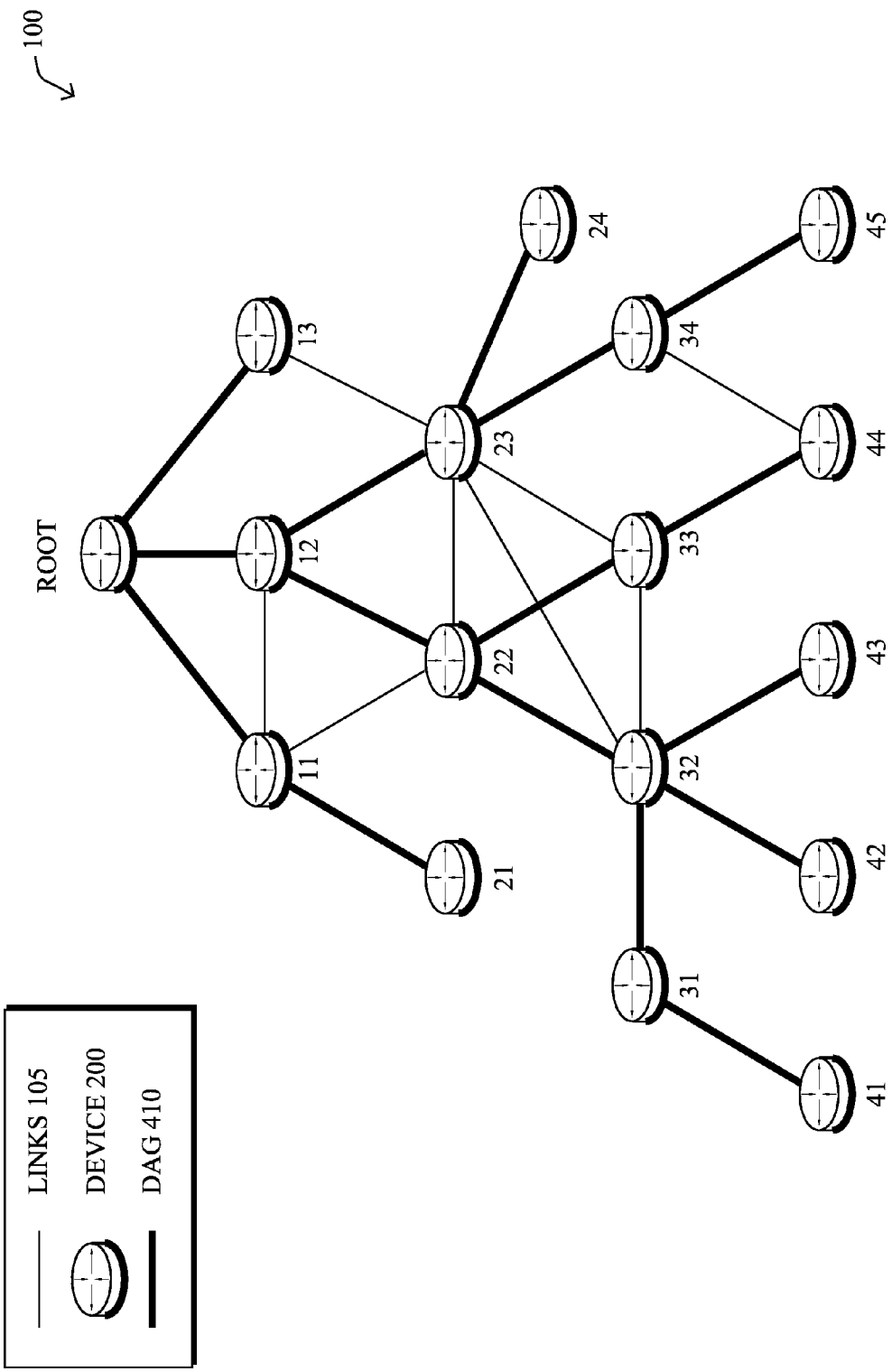
FIG. 4 illustrates an example directed acyclic graph (DAG) in the computer network.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links foam the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

RPL supports two distinct modes of operation: a storing mode and a non-storing mode. In the storing mode, each node provides information to its DAG parent(s) about the prefix (es)/address(es) that it owns. Upon receiving this information, each node populates its routing table 245 in support of downward routing (routing packets in the DOWNWARD direction—as a reminder UPWARD routing is performed by sending packet along the DAG toward the DAG root). Conversely, in the non-storing mode, nodes do not store routing information (except parents' next hops in support of the DAG and UPWARD routing). This allows for memory saving on intermediate nodes and is particularly suited to (although not restricted to) P2MP and MP2P traffic. Indeed, when a node sends a packet upward (e.g., to a concentrator potentially co-hosted with the DAG root or an NMS), the packet simply follows the DAG. In the opposite direction (e.g., packets sent by the NMS to a meter or a set of meters), since intermediate nodes do not store routes, the packets are source routed. For instance, the chosen route is set forth within the packet's header (e.g., an IPv6 header), according to a source-routing head-end node's routing decision.

As noted above, one of the main challenges with source routing (e.g., a "non-storing mode"), however, is that it may add significant header overhead to packets. For instance, in many LLNs, such as AMI networks, it is not rare to see networks with large diameters (e.g., up to 25 hops in some cases). In this case, the IPv6 Extension header used to source route the packet, such as that specified in an IETF Internet Draft, entitled "An IPv6 Routing Header for Source Routes with RPL" <draft-ietf-6man-rp1-routing-header-03> by Hui, et al. (Mar. 29, 2011 version), adds significant header overhead to a packet. This may be mitigated when using the defined header compression mechanisms, but it is only applicable when the same prefix is used in the entire network. Conversely, a network may use a "storing mode," in which intermediate devices are required to maintain routing states, thus not incurring additional header overhead. However, the memory requirements associated with route storage in storing mode can also become too large, particularly for constrained networks/nodes.

Lightweight Storing Mode

The techniques herein provide a balance between storing and non-storing modes by introducing a "lightweight storing mode" to significantly reduce header overhead and state requirements for forwarding downward traffic. In particular, a system in accordance with the embodiments herein introduces the use of label-switched paths (LSPs) and Hierarchical LSPs (e.g., dynamically implemented in response to overhead size) to support the lightweight storing mode, which, as described herein, uses IP forwarding for UPWARD traffic and LSP forwarding for DOWNWARD traffic.

Specifically, according to one or more embodiments of the disclosure as described in detail below, a management device, such as a root node, may monitor IP overhead of source-routed packets in non-storing mode (e.g., IP header sizes) or overhead of a storing mode (e.g., route table sizes) within a DAG in a computer network. If it is determined that the IP overhead is above a configured threshold, then in response, a trigger is initiated to have devices within the DAG label-switch downward traffic directed away from the root node within the DAG. Also, according to one or more additional embodiments of the disclosure as described in detail below, a device communicating within a DAG stores IP routes corresponding to upward traffic from the device directed toward a root of the DAG (e.g., simply default routes), and IP-routes upward traffic based on the IP routes. Conversely, the device also stores labels corresponding to downward traffic from the device directed away from the root of the DAG, and label-switches downward traffic based on the labels, accordingly.

Illustratively, the techniques described herein may be performed by hardware, software, and/or firmware, such as in accordance with routing process 244 and/or label-switching process 248, which may contain computer executable instructions executed by processor 220 to perform functions relating to the novel techniques described herein. For example, the techniques herein may be treated as extensions to conventional protocols, such as the RPL protocol, and as such, would be processed by similar components understood in the art that execute the RPL protocol, accordingly. Also, while the techniques herein generally indicate that the root node of a DAG perform certain techniques herein, other management devices or head-end applications (e.g., network management services or "NMS" servers, etc.) may also make use of the techniques herein, accordingly.

Figure 5:
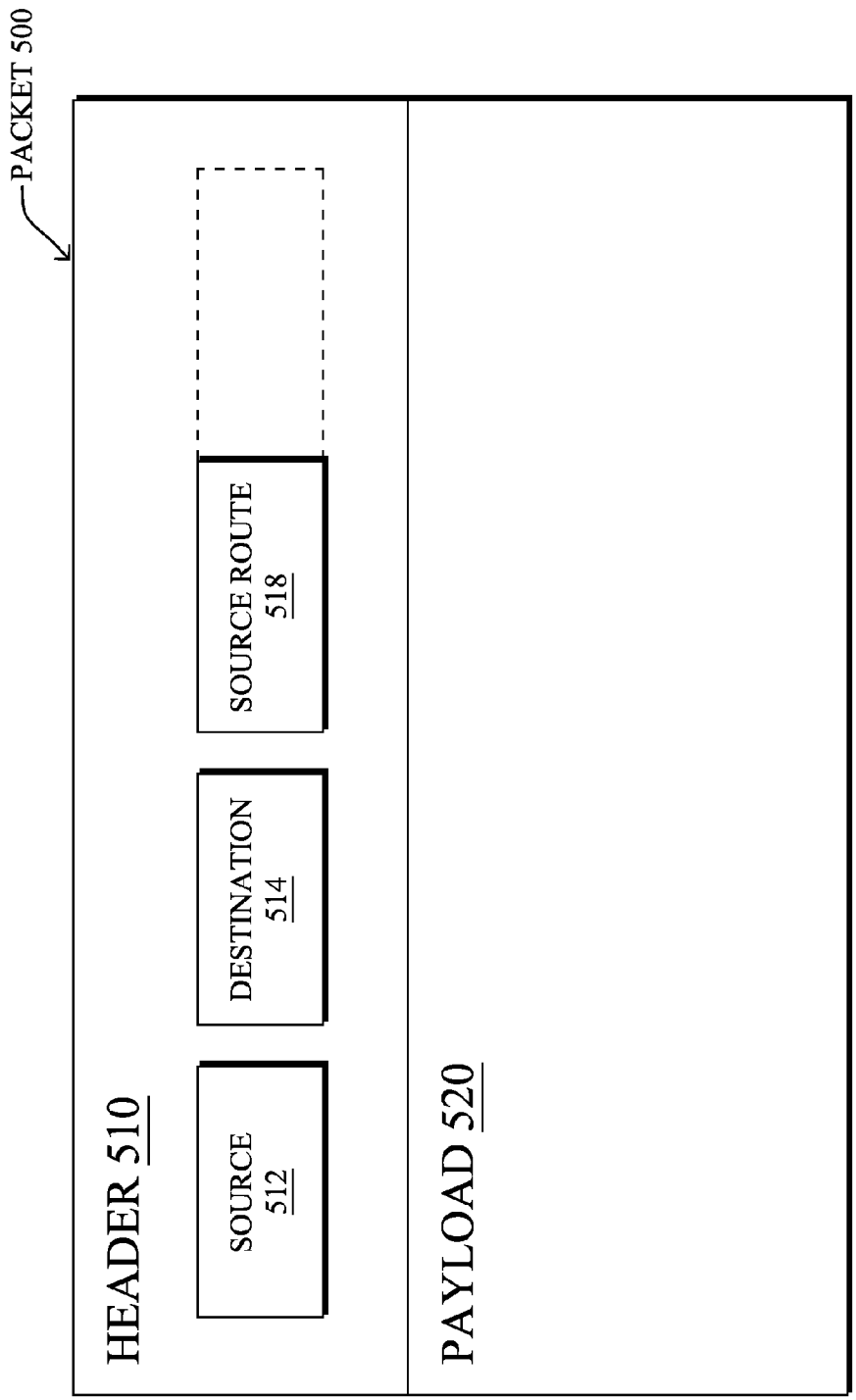
FIG. 5 illustrates an example packet.

Currently, RPL storing mode requires devices to store IP prefixes and maintain IP routing tables 245 used for downward traffic. Conversely, non-storing mode does not require devices to store IP prefixes or IP routing tables, but does require the use of IP source routes (based on source-routed packet headers). For instance, FIG. 5 illustrates an example packet 500 (e.g., 140 in FIG. 1), which may be found within a typical source-routed traffic flow. For example, a packet 500 may generally comprise a header 510 and a payload 520. The header 510 contains information used to relay the packet, such as a source address 512 and destination address 514. Also, for source routing of the packet, the packet 500 further includes a source route field 518, which generally contains an ordered listing of each intermediate device along a path to a destination device. As indicated by the dashed lines, field 518 may become larger in response to correspondingly longer paths (i.e., in terms of hop count) to reach a destination.

Operationally, the techniques herein introduce a new mode of operation (e.g., for RPL) as an alternative to both the storing and non-storing modes called a lightweight storing mode, in which devices only store label swapping tables (LFIB) and, as needed, may create hierarchical LSPs for use with downward traffic. Compared to the storing mode, lightweight storing mode considerably reduces memory requirements because devices do not maintain IP prefixes or IP routing tables. Using hierarchical LSPs further reduces memory requirements. Compared to non-storing mode, the techniques herein minimize source-routing overhead associated with header size. Note that packets are IP routed on their way to the DAG root (upward) (because routes necessary for upward traffic are limited in number) and then label switched away from the root (downward) (to reduce the amount of memory required to maintain downward routes).

Because the lightweight storing mode makes different tradeoffs from the storing and non-storing modes, according to one or more embodiments of the techniques herein, a mechanism is proposed to dynamically switch into this mode, thus triggering label distribution, when the tradeoffs justify it.

Figure 6:
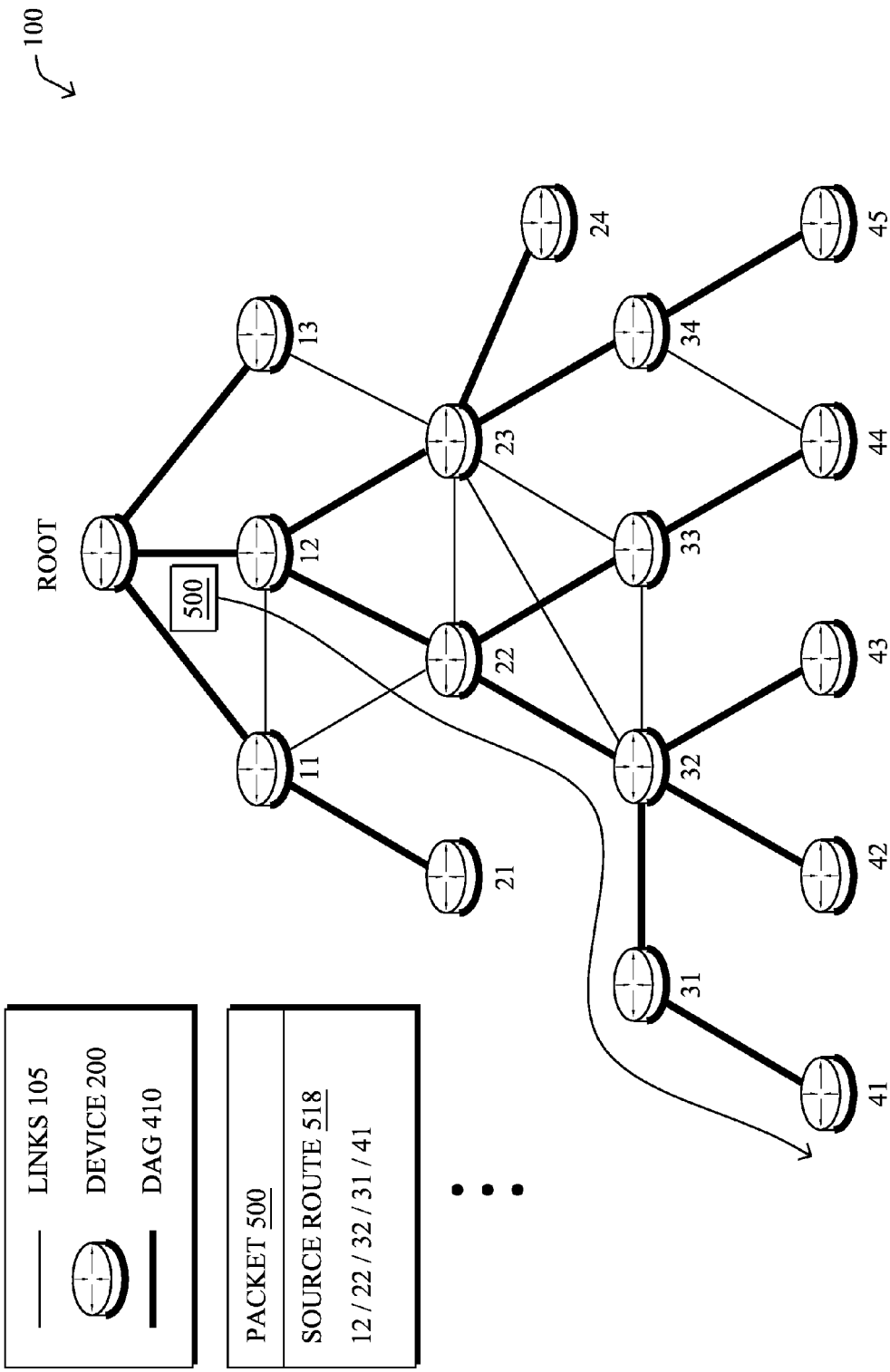
FIG. 6 illustrates an example source-routed packet in the computer network.

Illustratively, in one embodiment, global (or selective) label distribution may be dynamically triggered when the overhead of source-route headers 518 of the non-storing mode is too great. For example, FIG. 6 illustrates an example source-routed packet 500 (a packet 140) through the network 100. For instance, assume that the root node desires to transmit a packet 500 to node 41. Accordingly, the root node may prepare the packet 500 by inserting a source-route header 518 that contains an ordered list of the nodes along the desired transmission path, e.g., "12/22/32/31/41".

In another embodiment, global (or selective) label distribution may be dynamically triggered when the overhead of routing tables of the storing mode is too great. For instance, the DAG root, or else a particular node within the network, may determine that its routing table 245 contains a large number of routes, or else is reaching a maximum storage size, etc.

According to the techniques herein, therefore, the DAG root monitors the average/max size of the IP overhead, particularly the source route header 518 (e.g., an IP Extension Header used with source routing in RPL) when in non-storing mode, and/or the size of routing table 245 when in storing mode. If the overhead is not significant (in terms of percent or absolute value), packets are either source routed using the existing IP Extension header in non-storing mode, or routed conventionally when in storing mode.

If the DAG root determines that the overhead is too high, that is, that the IP header sizes or routing table sizes are above a configured threshold (depending upon the current mode of operation), then it may initiate a trigger to label-switch downward traffic. For instance, in one embodiment, the root node may set a newly defined bit in the DIO message 300, requesting all nodes in the network to activate the distribution of labels according to the mechanisms specified herein. In another embodiment, the DAG root may select and trigger individual tail-end devices to initiate the formation of LSPs to those specific devices acting as tail-end nodes. In doing so, the DAG root can selectively apply the use of LSPs to destinations that experience high amounts of traffic or high header overhead. As a result, intermediate devices only need to maintain LFIB for active LSPs. Note that in an additional embodiment, the intermediate devices themselves may trigger the use of an LSP, either requesting one from the DAG root or else initiating the LSP, in response to local monitoring of overhead, e.g., the size of their routing table 245.

Upon receiving a dynamic trigger to initiate label distribution for downward traffic, or else in response to static configuration, an intermediate device initiates label distribution illustratively by distributing locally-significant labels using RPL DAO messages 300 initiated at the triggered tail-end device. Any intermediate device that receives a label to label-switch the downward traffic (instead of source-routing the downward traffic) may then store the label mappings (LFIB 249).

Figure 7A:
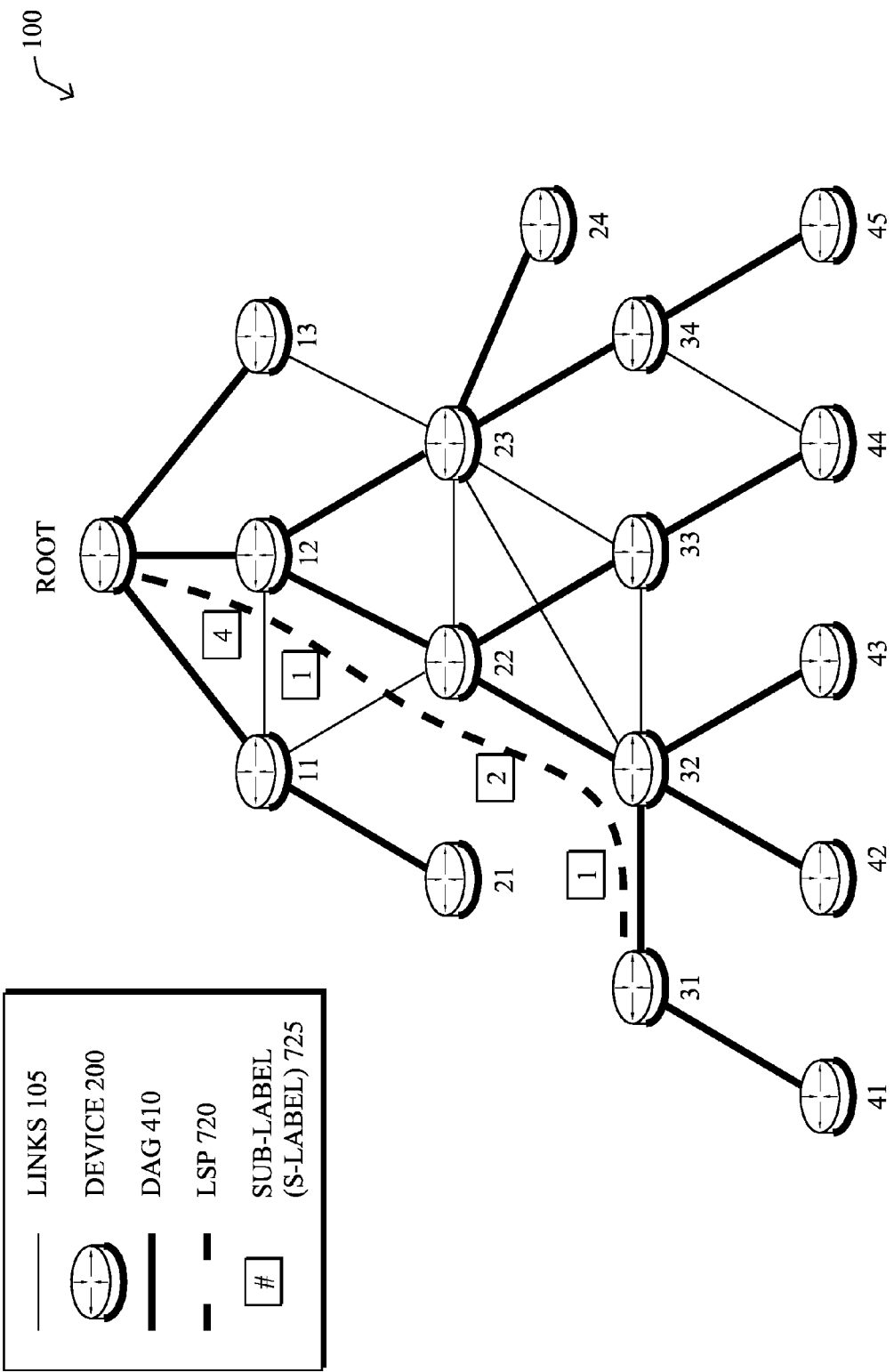
FIGS. 7A-D illustrate label-switched paths through the computer network.

As shown in FIG. 7A, when the DAG is (dynamically or statically) configured for label distribution, the tail-end of an LSP 720, for example, node 31, initiates label distribution for its LSP. Using RPL, in one illustrative embodiment, a 20-bit label may added to the DAO message 300 (e.g., sub-options field 328) for each (aggregated) prefix. Notably, labels similar to and/or compatible with conventional labels (e.g., multi-protocol label switching or "MPLS" labels) may be used, as well as any of the well-known mechanisms available to label-switched networks, such as time-to-live (TTL), quality of service (QoS) mapping, etc.

Labels are local to each node, and devices allocate their own labels as needed. As shown in FIG. 7A, for the first illustrated LSP 720, node 31 may allocate a first label 725 (shown as a "sub-label" or "s-label"), e.g., "1", node 32 allocates a second label "2", node 22 allocates a third label "1", and node 12 allocates a label "4". Note that there is no need for synchronization between nodes to ensure uniqueness of a label across nodes (the reuse of "1" is thus allowed since labels are local). Instead, a device needs to maintain a mapping between the locally chosen labels and those labels received in DAO messages in LFIB 249. Note also that there is no label distribution used for upward routing, since packets are IP routed following the DAG 410. Moreover, if a node does not support label switching, it could return an error to the initiator, the LSP would not be established, and the DAG root would be informed.

In particular, when a packet 140 is transmitted through the network, they are IP-routed toward the DAG root where the can be redirected downward along an LSP to their destination. For example, assume node 13 is transmitting a packet to node 31. As such, node 13 IP-routes the packet (traffic) upward toward the root node based on its stored upward IP routes 245. Upon receiving the IP packet, the DAG root determines the IP destination address (e.g., node 31), pushes the label 725 corresponding to the LSP 720 terminating at the destination, i.e., label "4", and the packet is then label-switched downward to its destination based on the (stored and swapped) labels.

According to one or more additional embodiments herein, the lightweight storing mode may start with one level of hierarchy (LSPs), and may then dynamically trigger hierarchical LSPs (H-LSPs) as needed. For example, when the size of the LFIB along a path exceeds a threshold (e.g., when a number of labels stored at a device is above a threshold), an H-LSP may be created to encapsulate the "sub" LSPs, such that the first level of sub-labels 725 may be removed from the intermediate nodes. In other words, the number of LSPs (using labels called sub labels or S-labels) grows with the number of nodes and destinations, which may lead to increasing the number of stored states in the network.

Figure 7B:
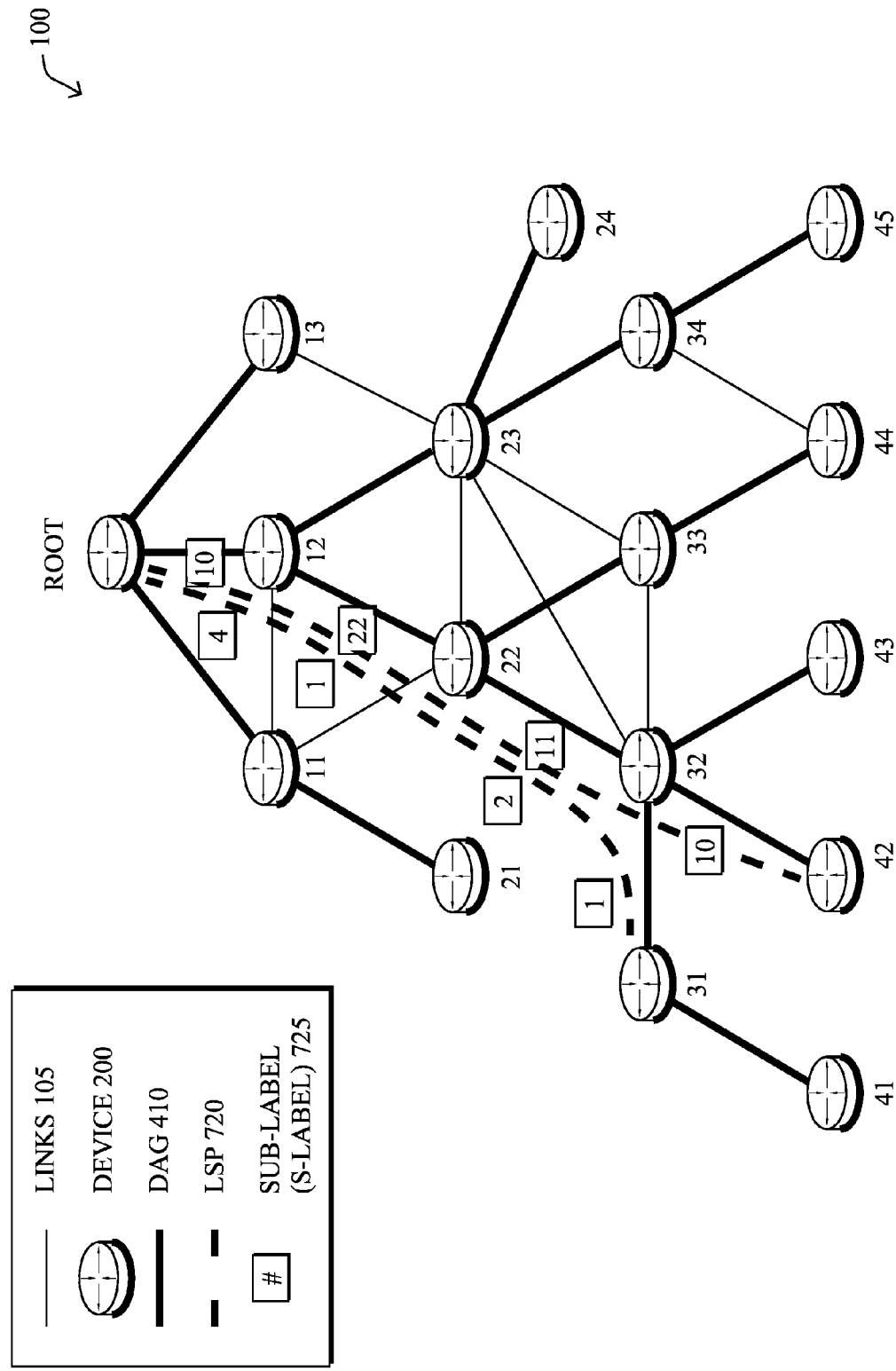
Figure 7C:
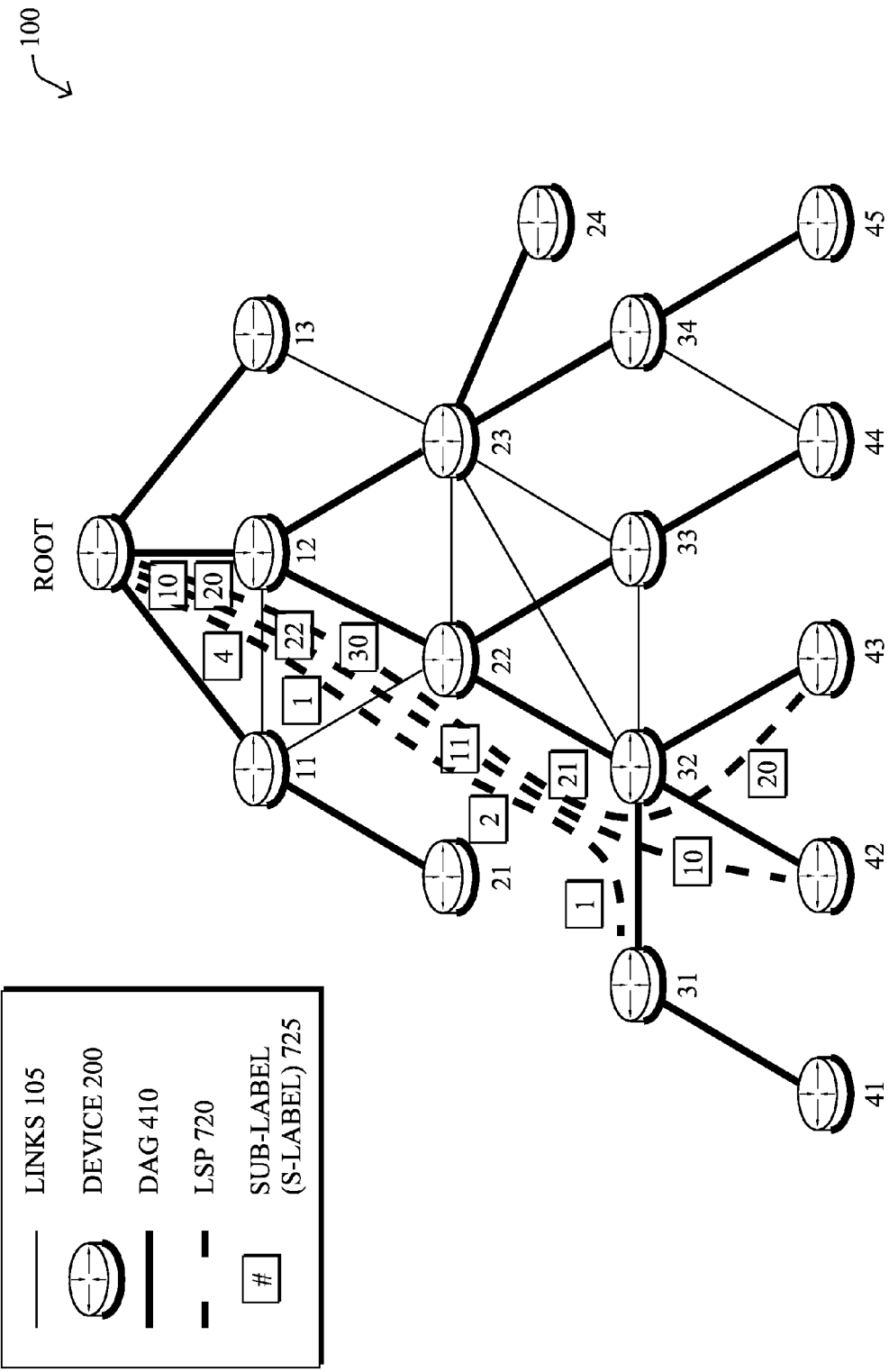
Figure 7D:
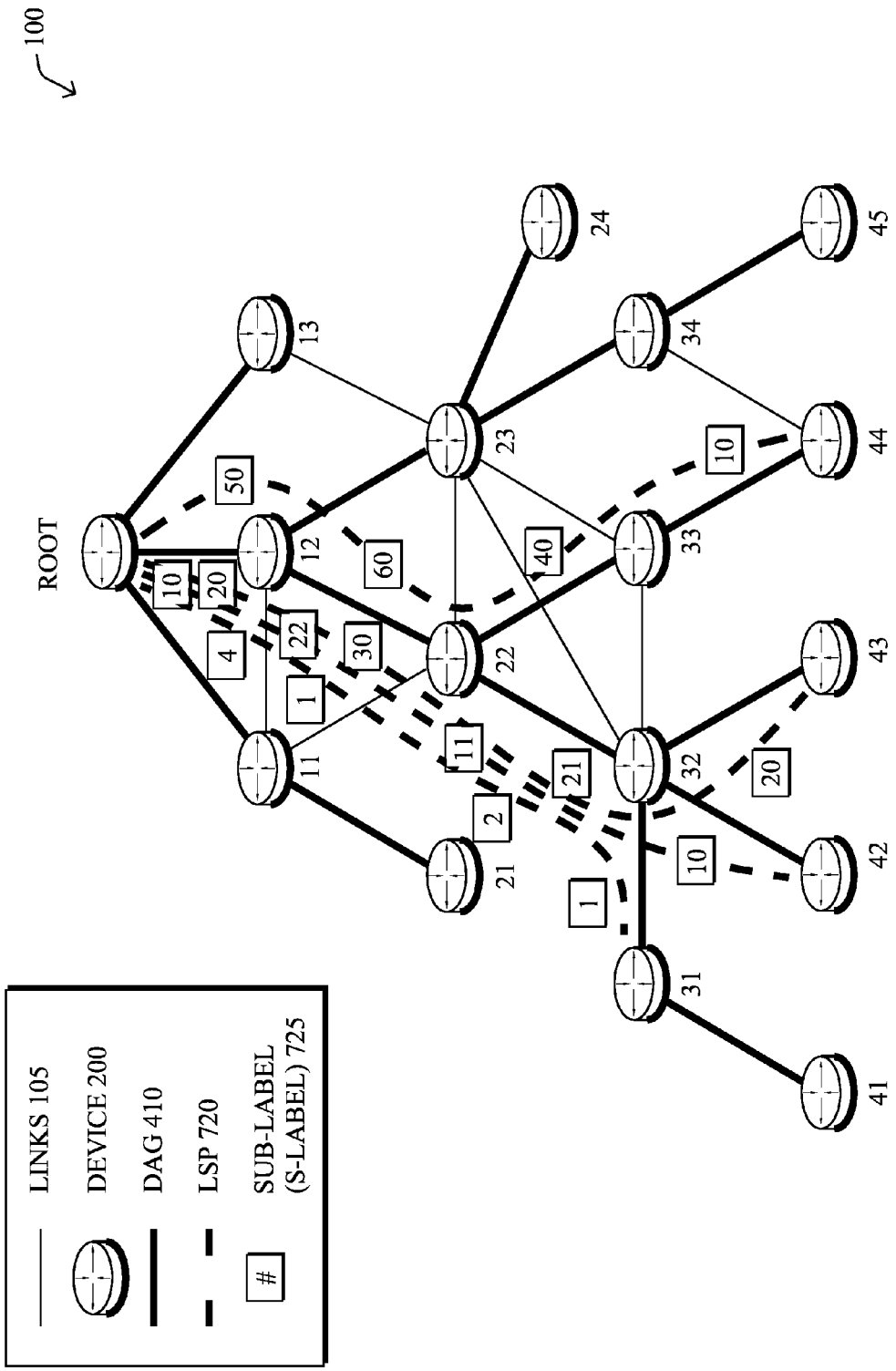

As an illustration, assume (as in most cases) that node 31 is not the only tail-end node in the network 100. For instance, as shown in FIGS. 7B-7D, nodes 42, 43, and 44 may also establish LSPs 720 to the root node, and as such, each intermediate device along the way needs to maintain a label 725 for the corresponding LSP's state. According to one embodiment herein, therefore, each node may monitor the number of states required to stores the labels (LFIB size), such that when the LFIB size exceeds some threshold, this triggers establishment of a hierarchical label-switched path (H-LSP). (Note that the triggering of a hierarchical LSP may be triggered by a tail-end node, an intermediate node, or the DAG root, as described below.)

To set up the H-LSP, the tail-end of the new H-LSP indicates to each node on the path the DAG root that each previously allocated label 725 is to be removed (e.g., using a newly defined flag in the DAO label distribution field). Each node on the path to the DAG root receives this message and then removes the corresponding state (label), with the exception of the DAG root itself. For example, node 32 used to allocate a label "2" for its LSP. When the newly specified flag is set, upon receiving the label "2", node 22 simply removes the corresponding state. Unlike the above label distribution where each node swaps the previous node's label for its own, however, the same label "2" for this LSP is relayed up to the DAG root, which is the illustrative head-end of the hierarchical LSP. (Note that other nodes may be the head-end node of H-LSPs, given additional signaling to inform the particular nodes to act accordingly.) When the root receives the S-label "2", it stores the corresponding state.

In addition, the H-LSP is set up when labels (e.g., called "H-Labels") are distributed along the H-LSP path on each intermediate node, where each node receives and stores the H-label associated with the H-LSP in place of the removed label. Note that an H-LSP may be signaled as a hierarchical LSP using a newly defined flag. Note also that intermediate S-Labels may be kept for a period of time sufficient for the H-LSP to be set up before removing the S-Labels along the S LSP.

Figure 8:
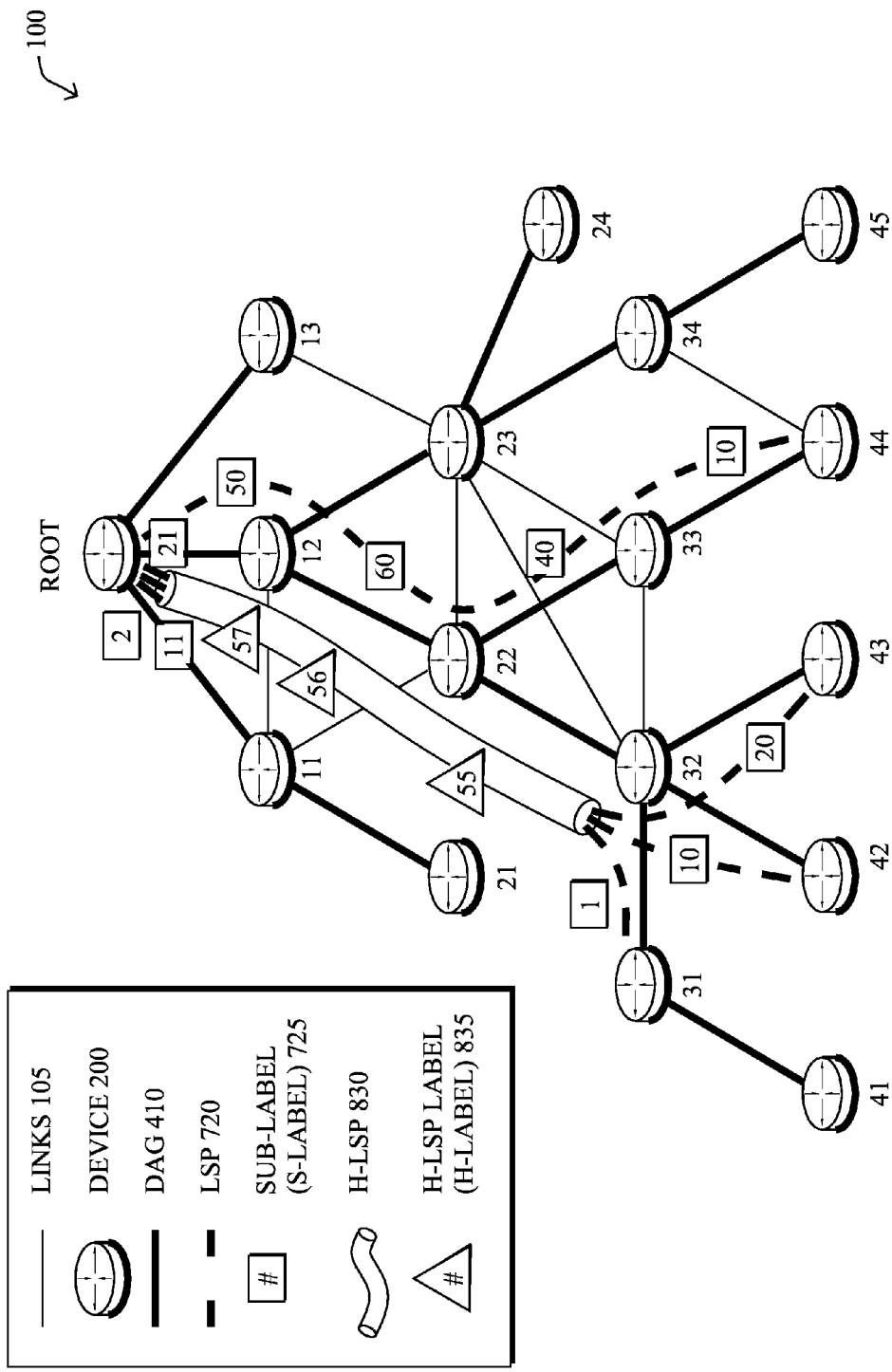
FIG. 8 illustrates an example hierarchical label-switched path in the computer network.

FIG. 8 illustrates an H-LSP 830 and associated H-labels 835 established along a highly labeled path through the network 100. For instance, as shown, all s-labels that are associated with encapsulated LSPs have been removed from intermediate nodes, which instead only maintain state for the H-LSP. The head-end node (e.g., DAG root) and tail-end node (e.g., node 32), however, still maintain the s-label states in order to maintain the proper sub-LSP operation (e.g., the head-end node operating to push a sub-label and the H-LSP label onto traffic destined through the H-LSP).

Notice how the s-labels 725 associated with the LSPs at node 32 in FIG. 7D are now stored by the H-LSP head-end node (DAG root) in FIG. 8. That is, once an IP-routed packet is received by the DAG root for a downstream node, it performs a look-up in its LFIB 249, pushes the S-label 725 (e.g., "2") and the H-label 835 (e.g., "57"), and forwards the packet. The H-LSP 830 allows the packet to reach the H-LSP tail-end node that removes the last H-LSP label, inspects its LFIB, swaps the labels (e.g., incoming sub-label "2" corresponds to outgoing sub-label "1"), and sends it to the appropriate next-hop (e.g., node 31). (Note that penultimate hop popping or "PHP" may also be used, as may be understood by those skilled in the art.)

Note also that not all sub-LSPs along an H-LSP path need be encapsulated. For instance, as shown in FIG. 8, the LSP 720 destined to tail-end node 44 is not encapsulated within the H-LSP 830, particularly since that LSP branches away from the H-LSP prior to the H-LSP tail-end node. Accordingly, nodes 12 and 22 may still maintain state for the sub-LSP in addition to the H-LSP. In this sense, nodes may store states for multiple LSPs and/or H-LSPs (e.g., headed to different tail-end nodes). Also, multiple H-LSPs may be further encapsulated into further H-LSPs, and so on.

As mentioned above, the LFIB threshold may be crossed by the node initiating the H-LSP (the tail-end node, e.g., node 32), or by any other nodes along the path. For example, nodes closer to the DAG root will generally store more LSP states, and also the various nodes may differ in their ability to store state. In other words, it may be that the "complaining" node may not be the node that must maintain the largest number of states. Assume, for instance, that node 12 "complains" that is has stored too many LSP labels 725 in its LFIB 249. As such, node 12 may specifically request an H-LSP to alleviate the situation. While in one embodiment, node 12 may specifically trigger node 32 to initiate the H-LSP, such as based on some inherent knowledge of the DAG shape or the shape of the over-burdening LSPs, more than likely the complaining node will "trigger" a device (further from the root than itself) into becoming the H-LSP tail-end node by notifying the root node.

In this particular embodiment, therefore, the root may receive an indication of resource (memory) contention from any node in the network (e.g., a new flag in the DAO message), that is, a trigger requesting an H-LSP. By observing the DAG shape, the DAG root may then optimally determine where H-LSPs may be established, thus selecting a set of one or more tail-end nodes for one or more corresponding H-LSPs 830. In particular, by making the selection of the H-LSP tail-end node by the DAG root, the enhanced visibility on the DAG shape and potential resources contentions (memory) on the nodes may be taken into consideration. Accordingly, the DAG root would then signal to the selected tail-end node(s) the need to trigger an H-LSP toward itself from the DAG root. Any so-selected nodes may then correspondingly initiate H-LSP label distribution for downward traffic to themselves, as described above.

To tear down an H-LSP, a reverse mechanism is defined herein whereby a node may request the removal of an H-LSP, such as when that node's LFIB size falls back below a second threshold. In this case, the requesting node may send a request to the H-LSP tail-end (unless the triggering node is the tail-end node of the H-LSP itself), and when all the LFIBs along a path fall below a threshold, the H-LSP may be torn down, accordingly. Alternatively, the requests to remove the H-LSP may be sent to the DAG root, which may have greater visibility and/or knowledge of whether all nodes along the H-LSP have fallen below the threshold. If so, the DAG root may then send the request (trigger) to remove the H-LSP to the respective tail-end node.

Figure 9:
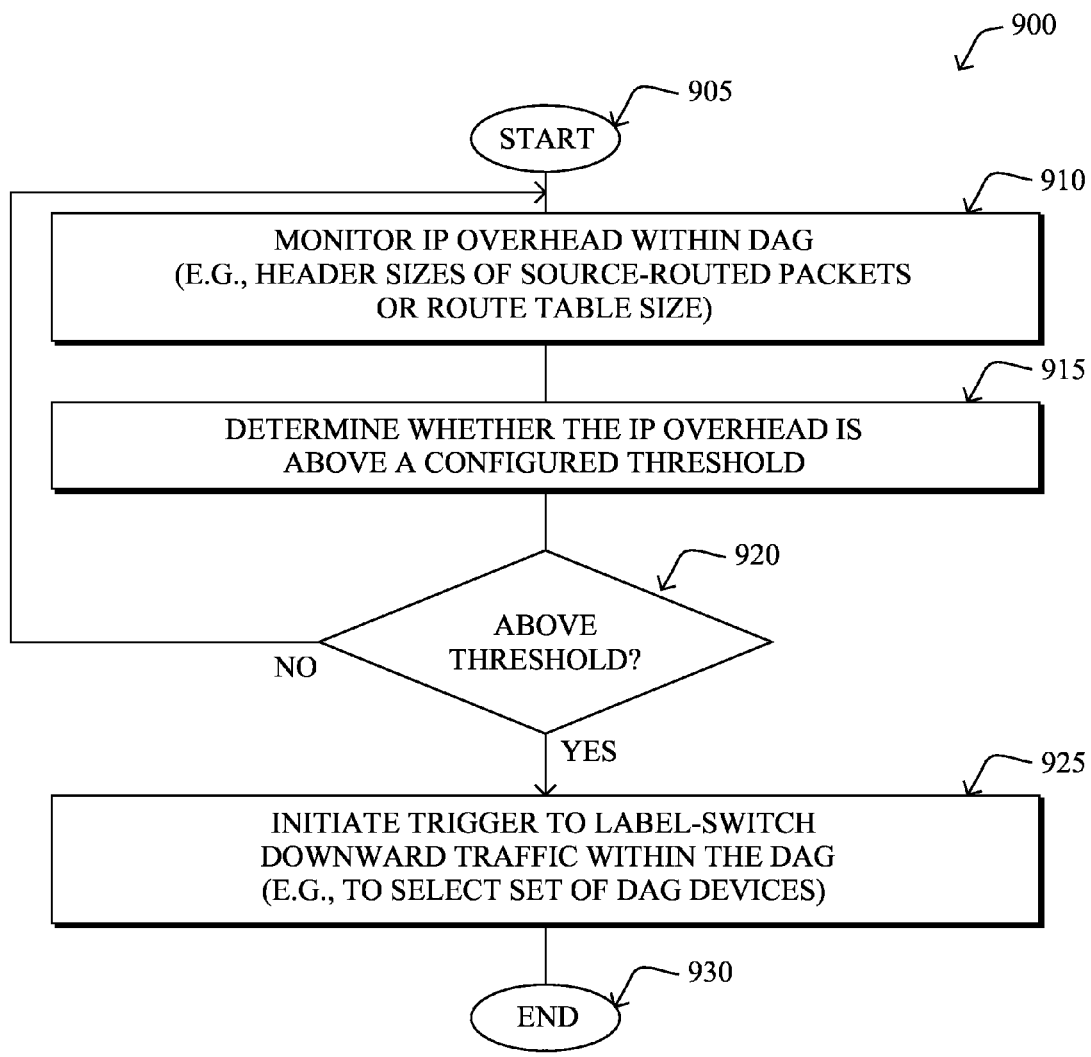
FIG. 9 illustrates an example simplified procedure for dynamic label-switching in accordance with one or more embodiments described herein.

FIG. 9 illustrates an example simplified procedure for dynamic label-switching in accordance with one or more embodiments described herein. The procedure 900 starts at step 905, and continues to step 910, where, as described in detail above, a root node (or other management node) monitors IP overhead within the DAG 410, such as IP header sizes of source-routed packets (header 510 or specifically field 518) being transmitted through the DAG in non-storing mode, or else monitoring IP routing table sizes (table 245) in storing mode. In step 915, the root node may determine whether the IP overhead is above a configured threshold (e.g., maximum or average sizes), and if so in step 520, then may initiate a trigger to label-switch downward traffic within the DAG in step 525, as described above. Note that as also described above, the trigger may be to the entire network (e.g., a DIO message 300), or else may be to a specifically selected set of DAG devices. The procedure 900 ends in step 930.

Figure 10:
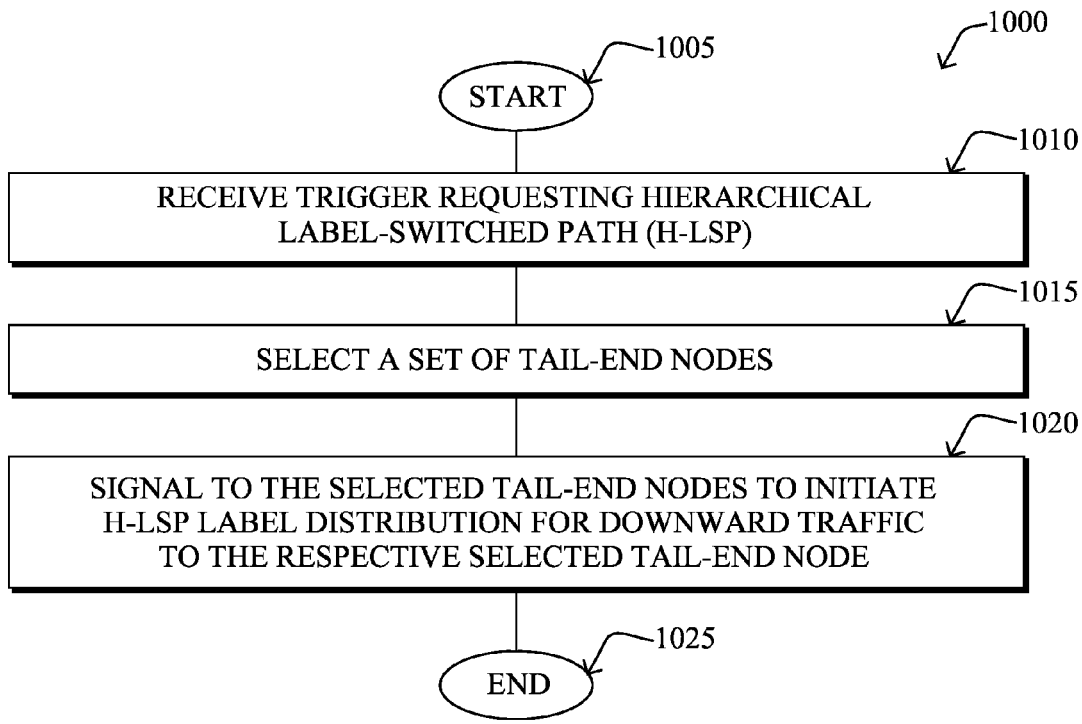
FIG. 10 illustrates another example simplified procedure for dynamic label-switching in accordance with one or more embodiments described herein, particularly for hierarchical LSPs.
Figure 11:
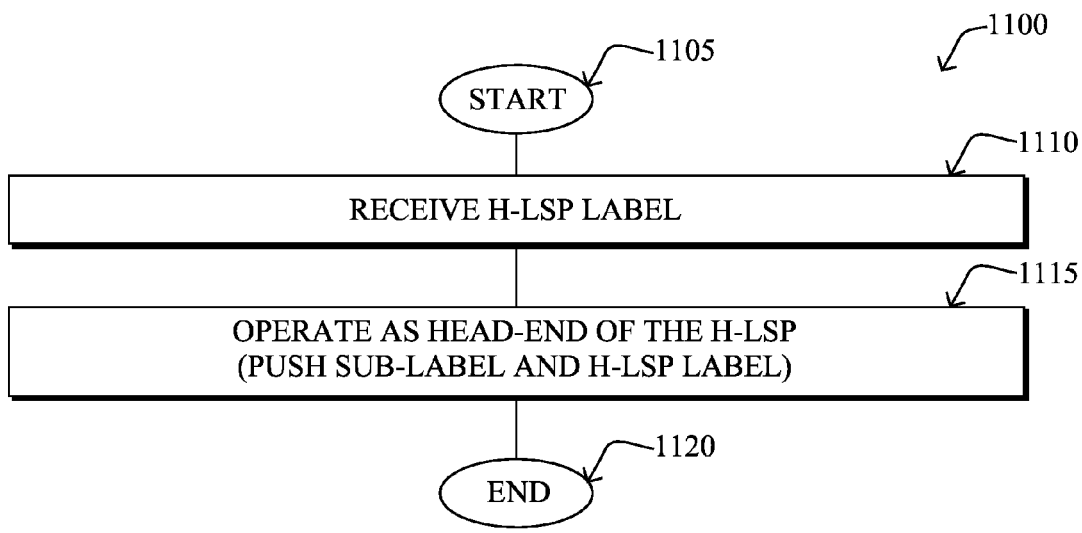
FIG. 11 illustrates another example simplified procedure for hierarchical LSP operation in accordance with one or more embodiments described herein.

Notably, FIGS. 10 and 11 illustrate example simplified procedures for dynamic label-switching in accordance with one or more embodiments described herein, particularly for hierarchical LSPs. For instance, the procedure (sub-procedure) 1000 of FIG. 10 starts at step 1005, and continues to step 1010, where the root node receives a trigger requesting an H-LSP, and as such, the root node may select a set of tail-end nodes in step 1015, and signals to the selected tail-end nodes to initiate H-LSP label distribution for downward traffic in step 1020, accordingly. The sub-procedure 1000 ends in step 1025. Procedure (sub-procedure) 1100 of FIG. 11, on the other hand, starts at step 1105, and continues to step 1110, where the root node receives an H-LSP label 835, and correspondingly operates as a head-end of the H-LSP 830, such as to push sub-labels and H-LSP labels in step 1115, as described above. The (sub-)procedure 1100 ends in step 1120.

Figure 12:
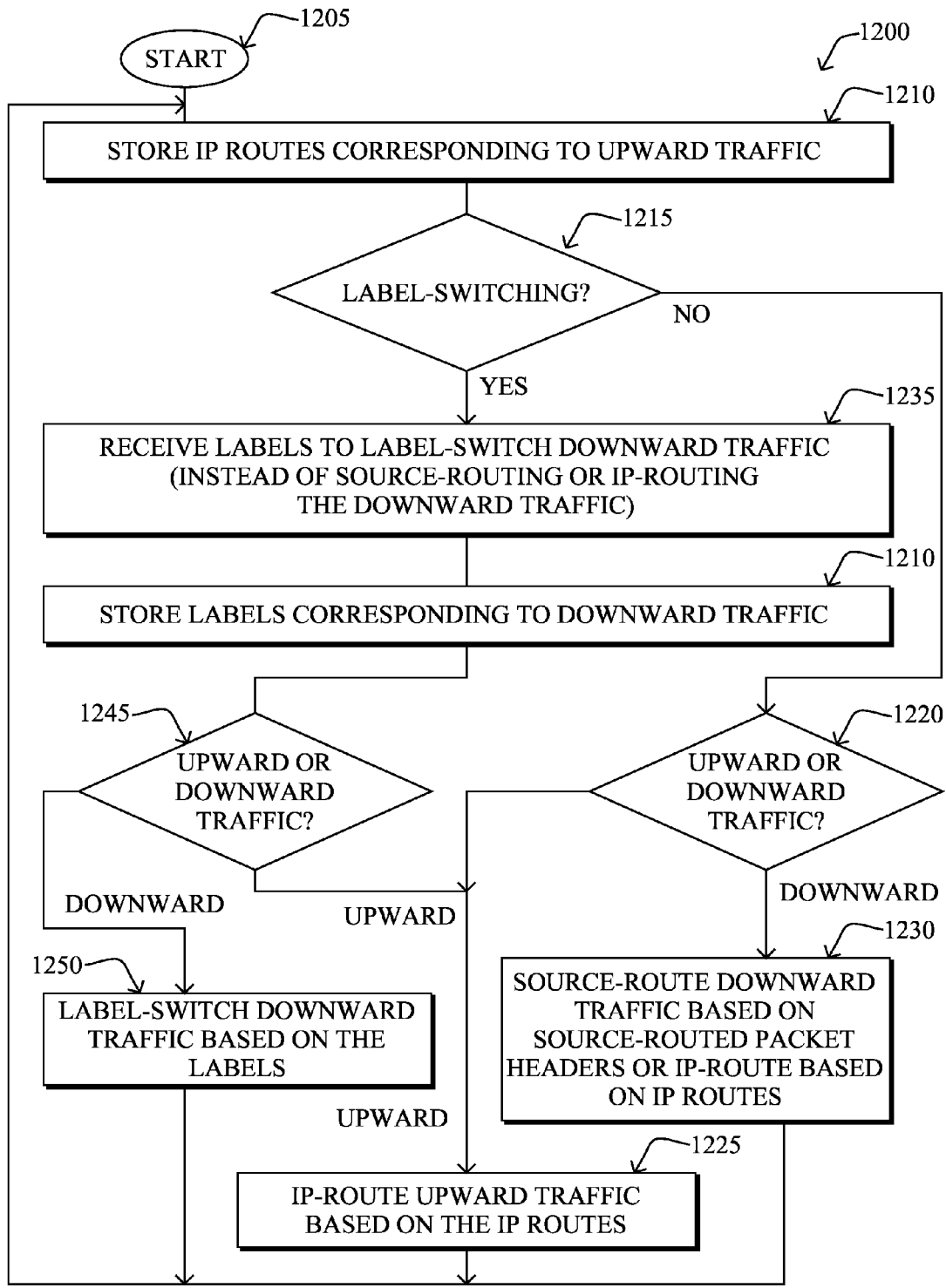
FIG. 12 illustrates an example simplified procedure for lightweight storing mode operation in accordance with one or more embodiments described herein.

From the perspective of an intermediate device, FIG. 12 illustrates an example simplified procedure for lightweight storing mode operation in accordance with one or more embodiments described herein. The procedure 1200 starts at step 1205, and continues to step 1210, where, as described in detail above, IP routes are stored (table 245) corresponding to at least upward traffic, e.g., DAG parents in order to transmit packets toward the root node. If the device is not currently operating according to label-switching in step 1215, then via step 1220, upward traffic is IP-routed based on IP routes in step 1225, and in step 1230 any downward traffic is either source-routed based on source-routed packet headers 518 (non-storing mode) or else IP-routed based on stored IP routes (table 245, storing mode).

On the other hand, in step 1215 the mode may be set for label switching, that is, the intermediate device has either been explicitly directed to use label-switching or else has simply begun to receive labels 725 in step 1235 to label-switch downward traffic (instead of source-routing or IP-routing the downward traffic), the labels being stored in step 1240 (LFIB 249). Now, though upward traffic is still IP-routed toward the root (step 1225), if traffic in step 1245 is downward, then in step 1250 the intermediate device label-switches the downward traffic based on the labels. The procedure 1200 continues to determine an appropriate storage/routing mode, illustratively returning to step 1210.

Figure 13:
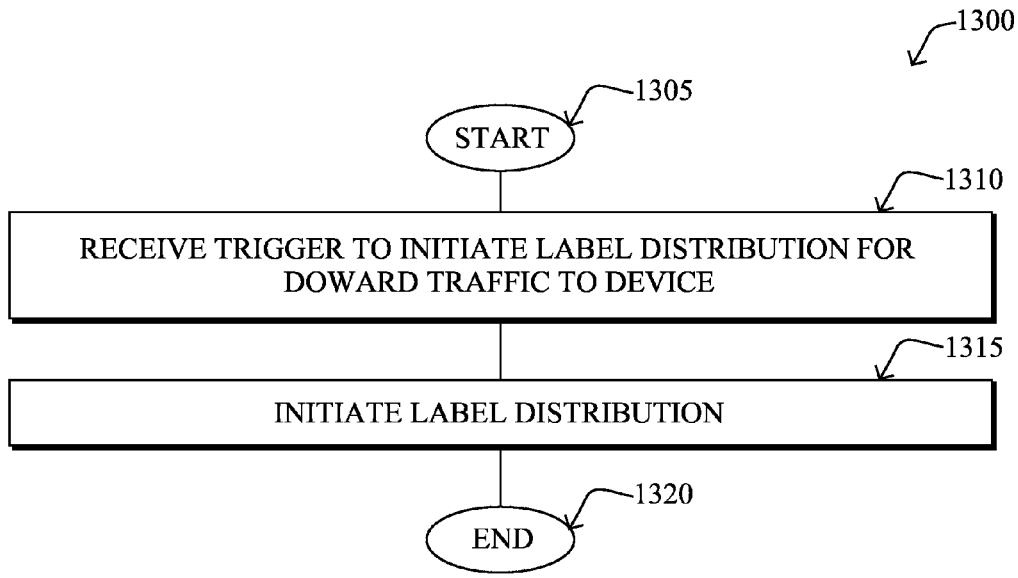
FIG. 13 illustrates another example simplified procedure for use with lightweight storing mode operation in accordance with one or more embodiments described herein.

FIG. 13 illustrates another example simplified (sub-)procedure for use with lightweight storing mode operation in accordance with one or more embodiments described herein. The procedure 1300 starts at step 1305, and continues to step 1310, where a device receives a trigger to initiate label distribution for downward traffic to device, such as from a DIO or a directed message, and in step 1315, correspondingly initiates the requested label distribution prior to the illustrative procedure ending in step 1320.

Figure 14:
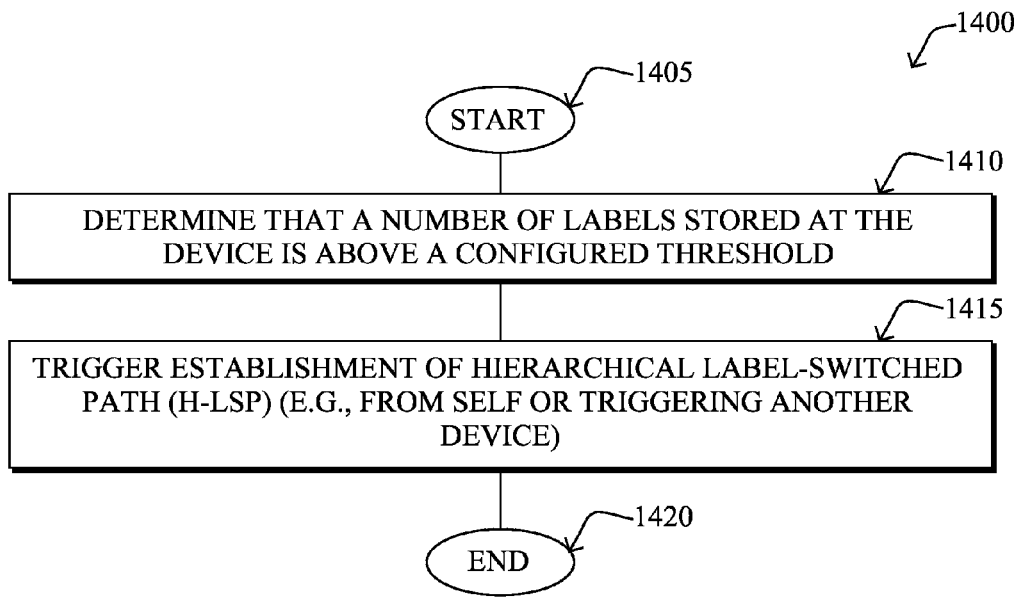
FIG. 14 illustrates another example simplified procedure for use with lightweight storing mode operation in accordance with one or more embodiments described herein, particularly for the establishment of a hierarchical LSP.

In addition, FIG. 14 illustrates another example simplified (sub-)procedure for use with lightweight storing mode operation in accordance with one or more embodiments described herein, particularly for the establishment of a hierarchical LSP. The procedure 1400 starts at step 1405, and continues to step 1410, where a device/node determines that a number of labels stored at the device is above a configured threshold, and in response, in step 1415, triggers establishment of an H-LSP 830. Notably, as mentioned above, the trigger may be to start as the tail-end node of the H-LSP, or else the device may trigger another downward device to act as an H-LSP tail-end node. The (sub-)procedure 1400 ends in step 1420.

Figure 15:
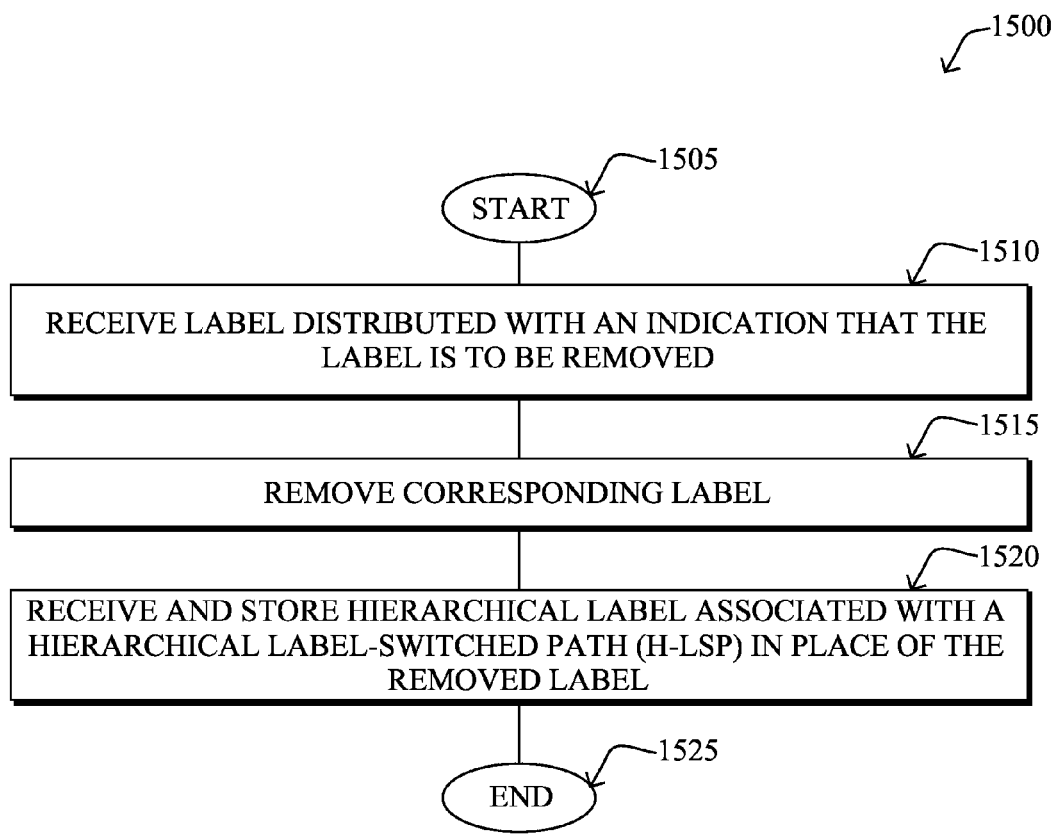
FIG. 15 illustrates another example simplified procedure for use with hierarchical LSPs in accordance with one or more embodiments described herein.

Lastly, FIG. 15 illustrates another example simplified procedure for use with hierarchical LSPs in accordance with one or more embodiments described herein. The procedure 1500 starts at step 1505, and continues to step 1510, where an intermediate node/device receives a label 725 distributed with an indication that the label is to be removed. As such, the device may remove the corresponding label in step 1515, and then in step 1520 receives and stores a hierarchical label 835 associated with an H-LSP 830 in place of the removed label, and the procedure ends in step 1525. Note that steps 1520 and 1510/1515 may be reversed, or in other orders, such that the hierarchical label's state is maintained prior to removing the sub-label's state within the LFIB 249.

It should be noted, generally, that FIGS. 9-15 are merely examples for illustration, and are not meant to be limiting to the scope of the embodiments herein. For instance, while certain steps within the procedures 900 through 1500 may be optional as described above, certain steps may be included or excluded as desired, and the steps may also be in a different order where suitable.

The novel techniques described herein, therefore, provide a lightweight storing mode and dynamic label-switching in constrained computer networks. In particular, a system in accordance with the techniques herein introduces the concept of using LSPs and Hierarchical LSPs to support a lightweight storing mode, which is achieved by dynamically triggering global or selective label distribution when the overhead of a storing and/or non-storing mode is too great. By doing so, the techniques herein alleviate major drawbacks of storing and non-storing modes within constrained networks (e.g., operating under the RPL protocol). Namely, the techniques reduce header overhead when compared to non-storing mode that uses an IP Extension header for specifying a source-route. In networks with large diameters, the packet header size may become extremely problematic, however in accordance with one or more embodiments herein, the packet header used to source-route the packet is limited to the label length (e.g., 20 bits) and does not grow with the number of hops. Also, the techniques reduce state requirements when compared to a full storing mode that maintains IP prefixes and IP route tables along intermediate devices in a network. Note that this in unlike other conventional label-switching networks (e.g., MPLS), such that the non-storing nodes according to the techniques herein need only store label swapping tables (LFIBs) for downward traffic, and do not store IP routes.

While there have been shown and described illustrative embodiments that provide a lightweight storing mode and dynamic label-switching in constrained computer networks, it is to be understood that various other adaptations and modifications may be made within the spirit and scope of the embodiments herein. For example, the embodiments have been shown and described herein with relation to LLNs, and more particularly, to the RPL protocol. However, the embodiments in their broader sense are not as limited, and may, in fact, be used with other types of networks and/or protocols, particularly those that may be constrained or would otherwise benefit from the techniques herein. Also, while the techniques described above make reference to wireless communication or other shared media (e.g., PLC), other types of communication media (e.g., wired) may also be used.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
communicating as a device within a directed acyclic graph (DAG) in a computer network;
storing Internet Protocol (IP) routes at the device corresponding to upward traffic from the device directed toward a root of the DAG;
IP-routing only upward traffic based on the IP routes;
storing labels at the device corresponding to downward traffic from the device directed away from the root of the DAG; and
label-switching only downward traffic based on the labels.

2. The method as in claim 1, further comprising:
source-routing downward traffic at the device based on source-routed packet headers; and
receiving a trigger to label-switch downward traffic instead of source-routing the downward traffic, wherein the storing labels and label-switching are in response to the received label.

3. The method as in claim 1, further comprising:
IP-routing only downward traffic at the device based on stored IP routes; and
receiving a trigger to label-switch downward traffic instead of IP-routing the downward traffic, wherein the storing labels and label-switching are in response to the received label.

4. The method as in claim 3, further comprising:
determining that a number routing table entries stored at the device is above a configured threshold; and
in response, internally generating the received trigger.

5. The method as in claim 1, further comprising:
receiving a trigger at the device to initiate label distribution for downward traffic to the device; and
in response to the trigger, initiating label distribution for downward traffic to the device.

6. The method as in claim 1, further comprising:
determining that a number of labels stored at the device is above a configured threshold; and
in response, triggering establishment of a hierarchical label-switched path (H-LSP).

7. The method as in claim 6, wherein a tail-end node of the H-LSP is the device.

8. The method as in claim 6, wherein a tail-end node of the H-LSP is a second device further from the root of the DAG than the triggering device, the method further comprising:
triggering the second device into becoming the H-LSP tail-end node.

9. The method as in claim 1, further comprising:
receiving a label distributed with an indication that the label is to be removed;
removing the corresponding label from being stored at the device;
receiving a hierarchical label associated with a hierarchical label-switched path (H-LSP) in place of the removed label; and
storing the hierarchical label.

10. An apparatus, comprising:
one or more network interfaces to communicate within a directed acyclic graph (DAG) in a computer network;
a processor coupled to the network interfaces and adapted to execute one or more processes; and
a memory configured to store a process executable by the processor, the process when executed operable to:
store Internet Protocol (IP) routes corresponding to upward traffic from the apparatus directed toward a root of the DAG;
IP-route only upward traffic based on the IP routes;
store labels corresponding to downward traffic from the apparatus directed away from the root of the DAG; and
label-switch only downward traffic based on the labels.

11. The apparatus as in claim 10, wherein the process when executed is further operable to:
source-route downward traffic based on source-routed packet headers;
receive a trigger to label-switch only downward traffic instead of source-routing the downward traffic, wherein the storing labels and label-switching are in response to the received label.

12. The apparatus as in claim 10, wherein the process when executed is further operable to:
IP-route only downward traffic based on stored IP routes; and
receive a trigger to label-switch downward traffic instead of IP-routing the downward traffic, wherein the storing labels and label-switching are in response to the received label.

13. The apparatus as in claim 10, wherein the process when executed is further operable to:

receive a trigger to initiate label distribution for downward traffic to the apparatus; and in response to the trigger, initiate label distribution for downward traffic to the apparatus.

14. The apparatus as in claim 10, wherein the process when executed is further operable to:

determine that a number of labels stored is above a configured threshold; and in response, trigger establishment of a hierarchical label-switched path (H-LSP).

15. A method, comprising:

monitoring Internet Protocol (IP) overhead within a directed acyclic graph (DAG) in a computer network;

determining whether the IP overhead is above a configured threshold; and in response to the IP overhead being above the configured threshold, initiating a trigger to label-switch only downward traffic directed away from a root node within the DAG.

16. The method as in claim 15, wherein determining whether the IP overhead is above the configured threshold is based on one of either an average size or a maximum size of IP header sizes of source-routed packets being above the configured threshold.

17. The method as in claim 15, wherein determining whether the IP overhead is above the configured threshold is based on whether a size of IP routing tables for IP-routing of downward traffic in the DAG is above the configured threshold.

18. The method as in claim 15, further comprising:

selecting one or more devices within the DAG to act as tail-end nodes of label-switched paths, wherein the initiated trigger is specific to the one or more devices.

19. The method as in claim 15, wherein the monitoring, determining, and initiating are performed by the root node.

20. The method as in claim 19, further comprising:

receiving a hierarchical label-switched path (H-LSP) label at the root node;

operating as a head-end of the H-LSP to push a sub-label and the H-LSP label onto traffic destined through the H-LSP.

21. The method as in claim 15, further comprising:

receiving a second trigger requesting a hierarchical label-switched path (H-LSP);

selecting, in response to the second trigger, a set of one or more tail-end nodes for one or more corresponding hierarchical label-switched paths from devices within the DAG; and signaling to the selected tail-end nodes to initiate H-LSP label distribution for downward traffic to the respective selected tail-end node.

22. An apparatus, comprising:

one or more network interfaces to communicate with a directed acyclic graph (DAG) in a computer network;

a processor coupled to the network interfaces and adapted to execute one or more processes; and a memory configured to store a process executable by the processor, the process when executed operable to:

monitor Internet Protocol (IP) overhead within the DAG;

determine whether the IP overhead is above a configured threshold; and in response to the IP overhead being above the configured threshold, initiate a trigger to label-switch only downward traffic directed away from a root node within the DAG.

23. The apparatus as in claim 22, wherein the process when executed to determine whether the IP overhead is above the configured threshold is operable to determine whether the IP overhead is above the configured threshold based on one of either an average size or a maximum size of IP header sizes of source-routed packets being above the configured threshold.

24. The apparatus as in claim 22, wherein the process when executed to determine whether the IP overhead is above the configured threshold is operable to determine whether the IP overhead is above the configured threshold based on whether a size of IP routing tables for IP-routing of downward traffic in the DAG is above the configured threshold.

* * * * *

UNITED STATES PATENT AND TRADEMARK OFFICE
CERTIFICATE OF CORRECTION

PATENT NO. : 8,593,986 B2  Page 1 of 1
APPLICATION NO. : 13/150956
DATED : November 26, 2013
INVENTOR(S) : Jean-Philippe Vasseur et al.

It is certified that error appears in the above-identified patent and that said Letters Patent is hereby corrected as shown below:

In the Specification

Column 5, line 41, please amend as shown:
[[roll-rp1-19>]]roll-rpl-19> by Winter, et al. (Mar. 13, 2011 version), pro- Column 8, line 6, please amend as shown:
one exists). These selected links[[ foam]] form the DAG 410 (shown as Column 8, line 41, please amend as shown:
with RPL" <draft-ietf-6man-[[rp1]]rpl-routing-header-03> by Hui, Signed and Sealed this
Seventeenth Day of June, 2014

Michelle K. Lee
*Deputy Director of the United States Patent and Trademark Office*